(12) United States Patent
Nesheim et al.

(10) Patent No.: US 8,852,662 B2
(45) Date of Patent: Oct. 7, 2014

(54) STRING CHEESE CUTTING SYSTEM

(75) Inventors: Gary Nesheim, Delafield, WI (US);
Grant L. Nesheim, Mazomanie, WI (US); Peter F. Nelles, Blue Mounds, WI (US)

(73) Assignee: Johnson Industries International, Windsor, WI (US)

(*) Notice: Subject to any disclaimer, the term of this patent is extended or adjusted under 35 U.S.C. 154(b) by 92 days.

(21) Appl. No.: 13/279,980

(22) Filed: Oct. 24, 2011

(65) Prior Publication Data

US 2012/0107470 A1    May 3, 2012

Related U.S. Application Data

(60) Provisional application No. 61/408,920, filed on Nov. 1, 2010.

(51) Int. Cl.
| | |
|---|---|
| *B29C 47/20* | (2006.01) |
| *B29C 47/34* | (2006.01) |
| *A01J 25/12* | (2006.01) |
| *A01J 25/13* | (2006.01) |
| *B29C 47/00* | (2006.01) |
| *B29C 47/22* | (2006.01) |
| *A23C 19/09* | (2006.01) |
| *B29C 47/24* | (2006.01) |

(52) U.S. Cl.
CPC ............. *A01J 25/12* (2013.01); *B29C 47/0016* (2013.01); *B29C 47/22* (2013.01); *A01J 25/13* (2013.01); *A23C 19/0908* (2013.01); *A23C 2250/10* (2013.01); *A23C 2270/15* (2013.01); *B29C 47/34* (2013.01); *B29C 47/24* (2013.01)
USPC ........... 426/389; 425/259; 425/261; 425/444; 426/517; 426/2

(58) Field of Classification Search
CPC ........... A23C 19/0908; A23C 2270/15; B29C 47/0016; B29C 47/34; B29C 47/24
USPC ................. 425/256, 257, 261, 382, 389, 441, 425/436 RM, 461, 463; 426/232, 389, 514, 426/516, 517
See application file for complete search history.

(56) References Cited

U.S. PATENT DOCUMENTS

| | | | | |
|---|---|---|---|---|
| 1,461,504 | A | * | 7/1923 | Tanzi ............................ 425/319 |
| 1,592,769 | A | * | 7/1926 | Imparato ...................... 425/319 |
| 2,120,943 | A | * | 6/1938 | Schutz ............................ 62/604 |
| 2,165,005 | A | * | 7/1939 | Petersen ....................... 426/478 |
| 2,781,546 | A | * | 2/1957 | Hallenbeck et al. .......... 425/159 |
| 2,902,715 | A | * | 9/1959 | Norman ........................ 425/463 |
| 2,958,900 | A | * | 11/1960 | Meakin ......................... 425/463 |
| 2,982,661 | A | * | 5/1961 | Thompson .................... 426/232 |
| 3,038,420 | A | * | 6/1962 | Immohr ........................ 425/463 |
| 3,421,220 | A | * | 1/1969 | Stanga ............................ 53/440 |
| 3,474,742 | A | * | 10/1969 | Hedglin ........................ 426/391 |
| 3,585,722 | A | * | 6/1971 | Legueux ....................... 426/231 |
| 3,700,373 | A | * | 10/1972 | Fowler .......................... 425/195 |
| 4,045,152 | A | * | 8/1977 | Peterson et al. .............. 425/419 |

(Continued)

*Primary Examiner* — Yogendra Gupta
*Assistant Examiner* — Emmanuel S Luk
(74) *Attorney, Agent, or Firm* — Boyle Fredrickson, S.C.

(57) ABSTRACT

A string cheese-forming machine provides for extrusion of cheese into control volumes, for example, implemented with tubes each movably blocked with a piston having a stop. Complete filling of each tube is detected before ejection of the cheese from the tubes is undertaken, thereby ensuring consistent product volume and weight.

20 Claims, 4 Drawing Sheets

(56) References Cited

U.S. PATENT DOCUMENTS

| | | | |
|---|---|---|---|
| 4,207,281 A * | 6/1980 | Bernard | 264/176.1 |
| 4,235,578 A * | 11/1980 | Cosmi | 425/173 |
| 4,352,830 A * | 10/1982 | Billett et al. | 426/421 |
| 4,613,294 A * | 9/1986 | Rose et al. | 425/438 |
| 5,656,305 A * | 8/1997 | Venrooij | 425/145 |
| 5,711,976 A * | 1/1998 | Abler | 426/36 |
| 5,879,721 A * | 3/1999 | Bradley | 425/218 |
| 6,058,598 A * | 5/2000 | Dixon et al. | 29/714 |
| 6,582,216 B2 * | 6/2003 | Kosman | 425/183 |
| 7,311,504 B2 * | 12/2007 | Bouldin et al. | 425/62 |
| 7,632,529 B2 * | 12/2009 | Lang | 426/249 |
| 7,661,941 B2 * | 2/2010 | Ouriev | 425/3 |
| 8,057,212 B2 * | 11/2011 | Chiang | 425/217 |
| 2002/0195733 A1 * | 12/2002 | Cortum et al. | 264/3.1 |
| 2003/0051851 A1 * | 3/2003 | Yamada | 164/113 |
| 2003/0054063 A1 * | 3/2003 | Trebbi et al. | 425/261 |
| 2005/0008730 A1 * | 1/2005 | Trebbi et al. | 425/261 |
| 2008/0044527 A1 * | 2/2008 | Bortone et al. | 426/250 |

\* cited by examiner

STRING CHEESE CUTTING SYSTEM

CROSS-REFERENCE TO RELATED APPLICATION

This application claims the benefit of U.S. provisional application 61/408,920 filed Nov. 1, 2010 hereby incorporated by reference.

BACKGROUND OF THE INVENTION

This invention relates generally to cheese processing equipment and in particular to a cutting machine for extruded string cheese.

String cheese is normally produced by extruding an Italian-style or "pasta filata" cheese, such as mozzarella, that has a grain structure producing string-like fibers. A "rope" of semi-molten extruded cheese is cut into short segments then cooled in a brine solution.

U.S. Pat. No. 4,759,704, describes a machine for extruding and cutting string cheese in which the cheese is extruded vertically downward toward a trip lever that activates a cutter, producing segments of the desired length. U.S. Pat. No. 4,902,523 describes a machine for extruding and cutting string cheese in which multiple sensors monitor horizontally extruded cheese ropes to trigger independent cutters at the appropriate lengths.

SUMMARY OF THE INVENTION

The present inventor has identified a substantial variation in the weight and volume of string cheese segments produced by current commercial machines believed to be inherent in length-based metering systems working on a semi-molten material. The present invention provides an improved cutting system for extruded string cheese that greatly reduces the variation among cut segments by constraining the semi-molten extruded cheese, before cutting, within a controlled volume provided by a sleeve and piston. By so constraining the semi-molten cheese, significantly greater uniformity in weight and volume is provided.

Specifically, the present invention provides apparatus and corresponding method for producing sections of extruded cheese employing a series of tubular sleeves having first ends adapted to receive cheese from an extruder. A series of pistons fit slidably within corresponding tubular sleeves, the pistons having first ends contacting cheese filling the tubular sleeves from the extruder and second ends moving in a direction of extrusion as the tubular sleeves are filled with cheese. A blocking element stops movement of the pistons when the tubular sleeves are filled with cheese to a predetermined volume and an ejector operates upon a filling of the tubular sleeves to the predetermined volume to eject cheese from the tubular sleeves.

It is thus one feature of at least one embodiment of the invention to provide an accurate method of providing uniform string cheese segments that addresses inherent inaccuracies of free-length measurement of a semi-molten material and the difficulty of weight measurement of a partially extruded rope.

The ejector may provide an actuator moving the second ends of the pistons counter the direction of extrusion to eject cheese from the first ends of the tubular sleeves.

It is thus one feature of at least one embodiment of the invention to provide a simplified mechanism that may employ a reciprocating piston motion for constraining then ejecting cheese segments.

The apparatus may provide a set of ports receiving cheese from the extruder and positioned between the extruder and the first ends of the series of tubular sleeves and the tubular sleeves may be mounted for reciprocation between a first and second position with respect to the ports in a direction substantially perpendicular to the axis so that a first set of tubular sleeves may align with ports in the first position and a different, second set of tubular sleeves may align with the ports in the second position. The ejector may operate to move the second ends of the pistons of the first set of tubular sleeves against the direction of extrusion for the first set of tubular sleeves when the tubular sleeves are in the second position and to move the second ends of the pistons of the second set of tubular sleeves against the direction of extrusion when the tubular sleeves are in the first position.

It is thus one feature of at least one embodiment of the invention to permit substantially continuous extrusion of the cheese through the use of two sets of tubular sleeves that may be alternately filled and ejected.

The interface between the ports and the tubular sleeves may provide a shearing of cheese extending between the ports and some tubular sleeves when the tubular sleeves move in the direction perpendicular to the axis between the first and second positions.

It is thus one feature of at least one embodiment of the invention to incorporate the cutting process into a movement of the tubes to further simplify the mechanism.

The ports may be spaced in a direction perpendicular to the axis at twice the distance of spacing of the tubular sleeves perpendicular to the axis and the ejector may provide an axially traveling ejector surface having spaced blocking elements contacting only every other piston.

It is thus one feature of at least one embodiment of the invention to provide an ejector that may interfere with the piston stops in a compact mechanism.

The direction of extrusion may be substantially horizontal and the ports may be separated by a distance no less than a diameter of a tubular sleeve and provide downwardly opening channels therebetween allowing cheese ejected from the first ends of the tubular sleeves to drop downward therefrom.

It is thus one feature of at least one embodiment of the invention to permit a gravity-assisted ejection of cut cheese segments in a compact mechanism employing a reciprocating piston motion.

The ports may be second ends of forming tubes having first ends receiving cheese from the extruder and further including a mixer positioned between the extruder and the forming tubes providing first and second cheese input ports. The forming tubes may be mounted for rotation about axes of the forming tubes to impart a spiral pattern to an interface between first and second cheese received from the first and second cheese input ports into the forming tubes.

It is thus one feature of at least one embodiment of the invention to permit decorative spiraling of the cheese segments in a system that provides for controlled volume and weight of the segments.

The tubular sleeves may be in adjacent parallel configuration and the apparatus may further include a sensor system detecting positions of the pistons indicating that multiple of the tubular sleeves are filled with cheese to the predetermined volumes to trigger the ejector.

It is thus one feature of at least one embodiment of the invention to provide controlled back pressure on the extruded cheese by delaying the injector stage until each of the tubes is filled to ensure complete filling of each of the tubular sleeves.

The sensor system may be an optical beam interrupted by movable elements moving out of occlusion with the optical beam by each piston when a corresponding tubular sleeve is filled with cheese to the predetermined volume.

It is thus one feature of at least one embodiment of the invention to provide a simple and robust sensing system suitable for a food-manufacturing environment.

The tubular sleeves may be bores in a block of a fluorocarbon polymer.

It is thus one feature of at least one embodiment of the invention to provide a simple readily cleaned structure for constraining and releasing semi-molten extruded cheese.

These particular features and advantages may apply to only some embodiments falling within the claims and thus do not define the scope of the invention.

DETAILED DESCRIPTION OF THE PREFERRED EMBODIMENT

Figure 1:
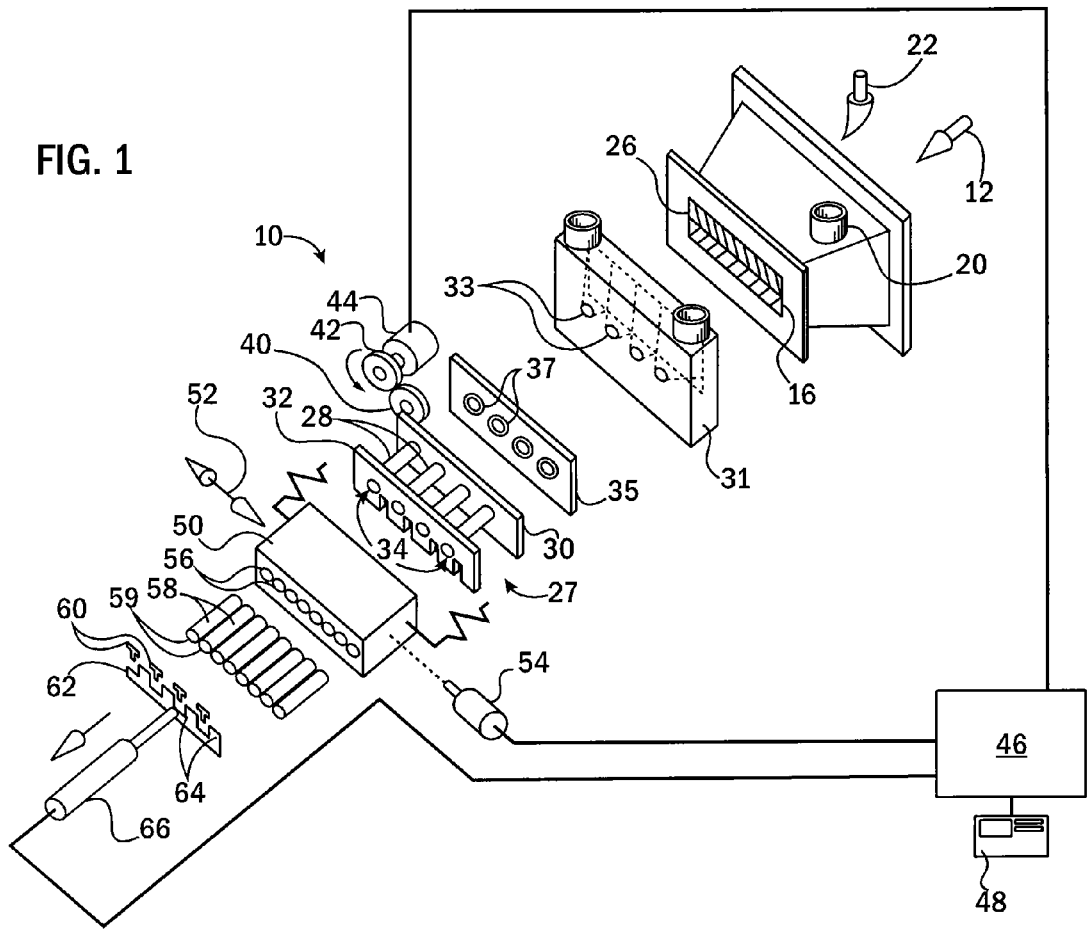
FIG. 1 is an exploded perspective view of the string cheese cutting apparatus per the present invention showing various components as controlled by a programmable controller or the like to provide for extrusion of cheese through forming tubes into a shuttle block having a precisely dimensioned bore and contained pistons.

Referring now to FIG. 1, a string cheese cutting apparatus 10 of the present invention may receive prepared pasta filata cheese along a horizontal axis 12 as indicated by an arrow into a funneling hopper 14. The pasta filata cheese may be provided by conventional kneading equipment of a type known in the art that develops the grain structure characteristic of these cheese types.

The funneling hopper 14 may also receive a contrasting cheese 22 or other similar foodstuff. The contrasting cheese 22 may, for example, coat the upper surface of a planar slab 16 of the pasta filata in a thin colored layer 26 across the upper surface of the planar slab 16. The funneling hopper 14 may further have various ports 20 receiving and outputting heating water to maintain the planar slab 16 and colored layer 26 at a proper consistency for extrusion.

The combined height of the planar slab 16 and colored layer 26 will approximate the cross-sectional dimension of the desired string cheese segments being produced and the horizontal width of the planar slab 16 and colored layer 26 will have a width greater than a combined cross-sectional dimension of the number of simultaneous extrusions being performed.

An exit port of the hopper 14 may deliver the combined planar slab 16 and colored layer 26 to a shaper die 31 fitting over the exit port. The shaper die 31 may divide the combined planar slabs 16 and colored layer 26 into adjacent square cross-sections defined by square entrance openings of the shaper die 31. Each of these square openings funnels to a circular hole 33 having a cross-section matching that of the ultimately produced string cheese and permitting extrusion of the cheese into a cylindrical shape.

Cheese extruded through the holes 33 passes through bearings 37 held by a bearing block 35 (as will be described below) and is received by corresponding forming tubes 28 in a forming assembly 27 and having ends fitting within the bearings 37. Each of the forming tubes 28 is mounted parallel to the axis 12 and arrayed across the horizontal width of the combined planar slab 16 and colored layer 26 and aligned with holes 33 in the shaper die 31. Generally the forming tubes 28 are spaced horizontally by slightly more than twice their width to provide a gap between each forming tube 28 slightly larger than the outer diameter of a forming tube 28. These gaps will provide an exit path for extruded cheese as will be described below.

First, open ends of the forming tubes 28 pass through a support plate 30 that abuts the bearing block 35 which in turn is aligned with the exposed planar face of the shaper die 31. Second, opposite open exit ends of the forming tubes 28 pass through a slide plate 32 displaced from but parallel to the support plate 30, as will be described below. The slide plate 32 includes apertures or cutouts 34 aligned with the gaps between the forming tubes 28 to provide openings between the openings of the forming tubes 28 for ejection of cheese as will be described. The forming tubes 28 are mounted to rotate about their respective axes within the support plate 30 and the slide plate 32.

Figure 2:
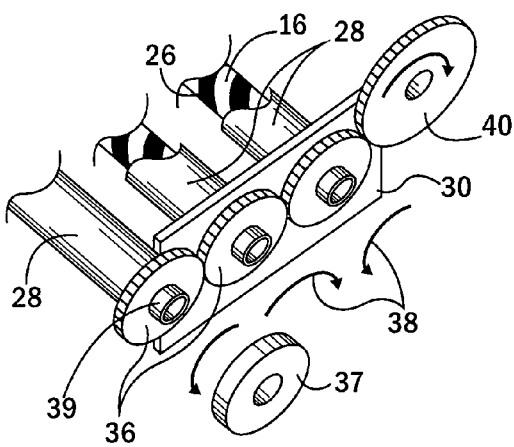
FIG. 2 is a perspective detail view of the forming tubes of FIG. 1 showing a rotating mechanism to provide for a spiral decoration of the cheese.

Referring to FIGS. 1 and 2, the first ends of the forming tubes 28 extending through the support plate 30 are received by correspondingly sized bores of spur gears 36 which are around the outer diameter of ends of the forming tubes 28 and attached thereto. The forming tubes 28 extend slightly through the spur gears 36 to provide a support lip 39 that may be received by the bearings 37 of the bearing block 35 described above to support the forming tubes 28 for rotation. The spur gears 36 inter-engage so that each forming tube 28 rotates in unison with the others in alternate counter-cyclic directions 38. An idler gear 40 communicates between one spur gear 36 and a corresponding drive gear 42 on a motor 44 permitting rotation of these forming tubes 28 during the extrusion by the motor 44. This rotation will produce a spiraling of the colored layer 26 and the planar slab 16 in the manner of a barber pole.

The motor 44 may be controlled by a control system 46, for example, a programmable logic controller executing a stored program for operating the string cheese cutting apparatus 10 the structure of which will be understood from the following description. The control system 46 may include a user console 48 for the entry of data or control parameters according to techniques well known in the art.

It should be understood that the above-described spiraling mechanism is optional and required only if the spiral form is desired.

Referring again to FIG. 1, the slide plate 32 may smoothly abut a leading edge of a shuttle block 50. The shuttle block 50, for example, may be formed of machined Teflon and a spring biased to ride against the trailing face of the slide plate 32 as it reciprocates back and forth in a horizontal direction 52 with respect to the slide plate 32 between the first and second positions. The spring biasing may be accomplished, for example, by air cylinders operating under control of the predetermined pressure.

The reciprocation of the shuttle block 50 may be controlled by an actuator 54, such as an air cylinder and valve, also under control of a stored program in control system 46.

The shuttle block 50 includes multiple bores 56 numbering twice the number of the forming tubes 28 and having half the horizontal spacing. In this way, in the first position, a first set of alternate bores 56 are aligned with the forming tubes 28 and a second set of bores 56 between the first set are aligned with cutouts 34. Conversely, in the second position, the second set of bores 56 is aligned with the openings of the forming tubes 28 and the first set of bores is aligned with cutouts 34.

Each of the bores 56 may receive a mold plug 58 being a cylindrical metal rod having a diameter closely fitting with the inner diameter of the bores 56 to form a piston-like structure there in. Trailing ends of the mold plugs 58 provide for stop heads 59 limiting insertion of the mold plugs 58 into the bores 56. In one embodiment, the mold plugs 58 excluding the stop heads 59 may have a length substantially equal to the axial length of the bores 56. As cheese is extruded through the forming tubes 28, the cheese will fill alternate bores 56 (depending on the position of the shuttle block 50) and push outward against a leading face of the corresponding mold plugs 58.

The rearward movement of the mold plugs 58 is arrested before the mold plugs are fully disengaged from the bores 56 by stop pins 60 (to be described in more detail below) aligned only with every other mold plug 58 in those bores 56 receiving cheese from a forming tube 28. A castellated ejection pusher 62 provides upward extending projections 64 positioned between stop pins 60 and, after the shuttle block 50 shifts, may be used to push the extended mold plugs 58 back into the bores 56 of the shuttle block 50 by the agency of an actuator 66 also controlled by control system 46.

Figure 3:
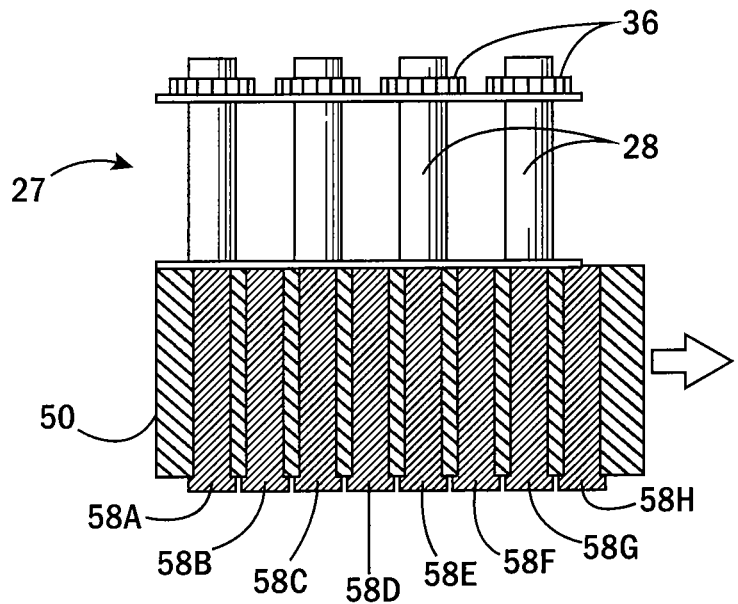
FIG. 3 is a top plan cross-section through the shuttle block of FIG. 1 with the contained pistons in a first position before receipt of cheese.

Referring now to FIG. 3, the operation of the string cheese cutting apparatus 10 may start, for example, with the shuttle block 50 in a leftmost position with respect to the tube assembly 27 with mold plugs 58*a*, 58*c*, 58*e*, and 58*g* (and their corresponding bores 56) aligned with forming tubes 28 to receive cheese therefrom.

Figure 4:
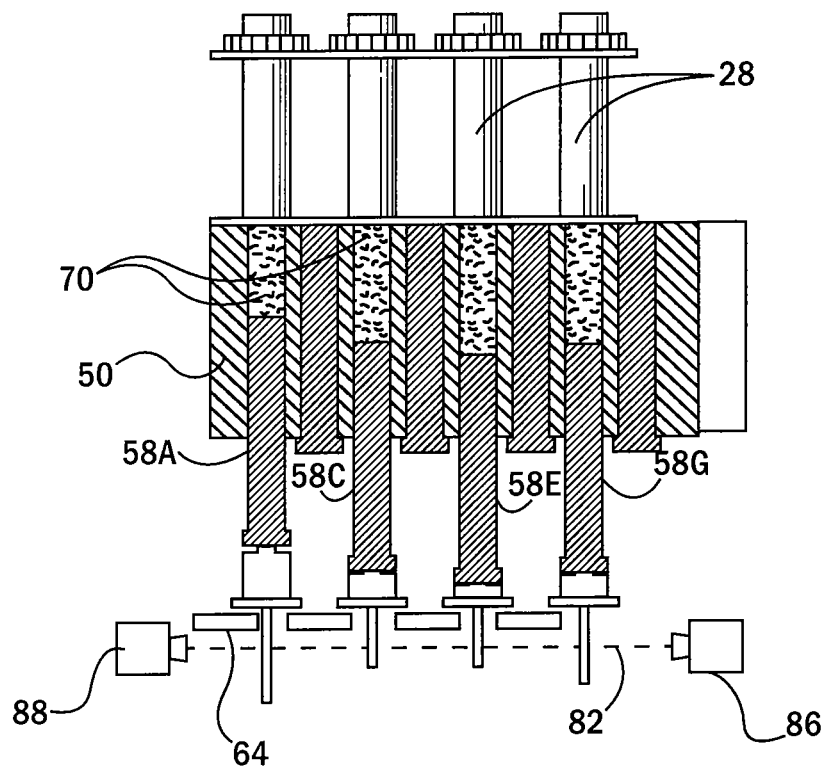
FIG. 4 is a figure similar to that of FIG. 3 showing the extrusion of cheese into alternate bores in the shuttle block.

Referring now to FIG. 4, as cheese 70 is received into the bores 56 associated with the mold plugs 58*a*, 58*c*, 58*e*, and 58*g*, those mold plugs travel backward displaced by the cheese 70. Generally, the mold plugs 58 will move at different rates because of an inherent uneven pressure in the extrusion process such as contributes in the prior art to inconsistent product weights.

Figure 5:
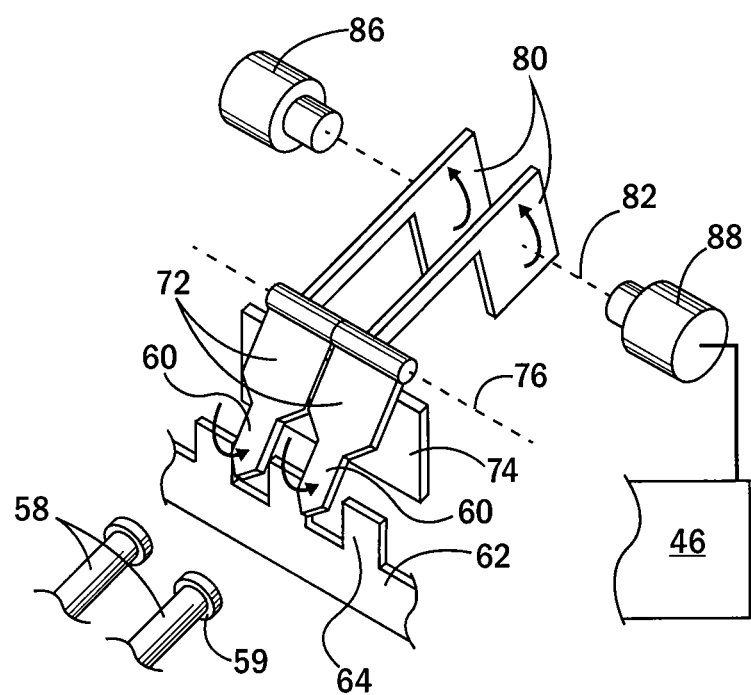
FIG. 5 is a fragmentary detail view of a stop assembly and ejector bar used for constraining the extension of the pistons and sensing that all pistons are fully extended for the alternate bores, and further for pressing inward on the pistons to eject the cheese from the alternate bores of the shuttle block when the shuttle block is in an ejection position for those bores.

Referring now momentarily to FIG. 5, each of the stop pins 60 may be mounted on a corresponding pivoting tab 72 that may pivot about a horizontal axis perpendicular to axis 12 backward within the gaps between projections 64 of the ejection pusher 62. This pivoting proceeds until the stop pins 60 are vertical and abut a stop plate 74. As the tabs 72 pivot backward they raise opaque flags 80 whose weight generally causes the stop pins 60 to be displaced forward before they contact the mold plugs 58. When the opaque flags 80 are in the lowered position they align along a horizontal axis of light beam 82 to block a light beam between a light transmitter 86 and light receiver 88. The light receiver 88 is connected to the control system 46 to detect when all of the flags 80 have been raised indicating that all of the mold plugs 58 are fully extended and the corresponding mold tabs 72 abut the stop plate 74. At this point of equal extension, the pressure in each of the bores 56 equalizes and the volumes (and weight) of cheese in each of the bores 56 is substantially equal. With the flags 80 fully raised out of the light beam 82, a signal is provided to the control system 46 to slide the shuttle block 50 leftward.

Figure 6:
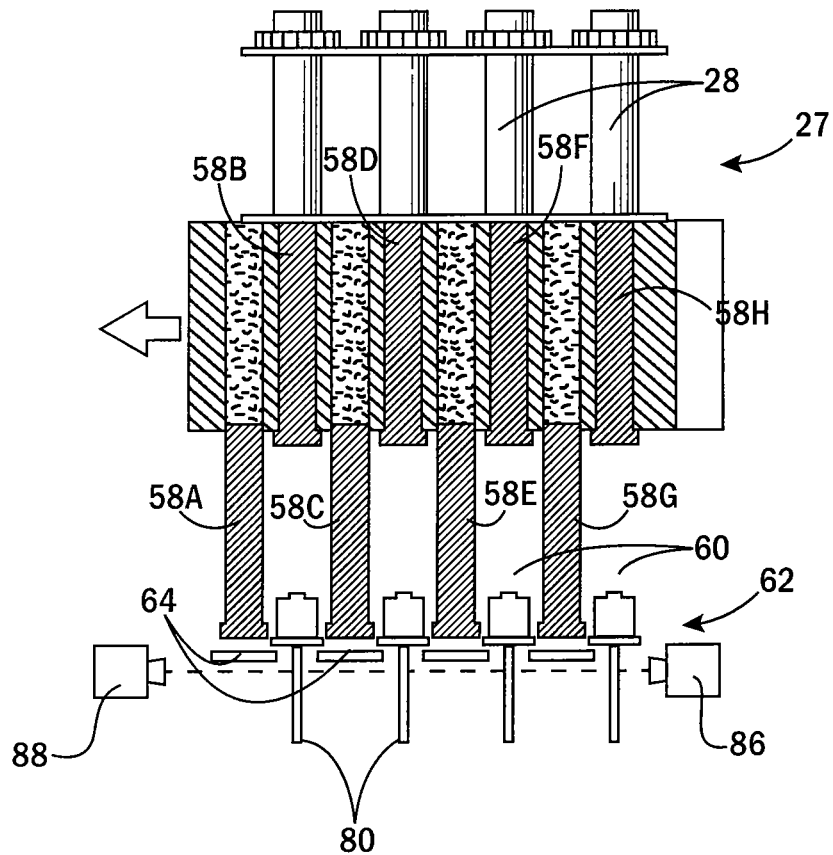
FIG. 6 is a figure similar to that of FIG. 4 showing the shuttle block in a second ejection position for ejection of the extruded cheese from the alternate bores.

As shown in FIG. 6, this leftward sliding of the shuttle block 50 moves the bores 56 of mold plugs 58*b*, 58*d*, 58*f*, and 58*h* into alignment with forming tubes 28 and the bores 56 of mold plugs 58*a*, 58*c*, 58*e*, and 58*g* into alignment with the cutouts 34 (shown in FIG. 1) providing a shearing action between the leading edge of the shuttle block 50 and the abutting surface of the slide plate 32 cutting the cheese 70 within the bores of mold plugs 58*a*, 58*c*, 58*e*, and 58*g* cleanly to length. This movement moves the mold plugs 58*a*, 58*c*, 58*e*, and 58*g* off of the stop pins 60 and into alignment with the projections 64 of the ejection pusher 62. The ejection pusher 62 may then be moved inward by the actuator 66, shown in FIG. 1, by the control system 46 using a simple delay timer from the motion of the shuttle block 50.

Figure 7:
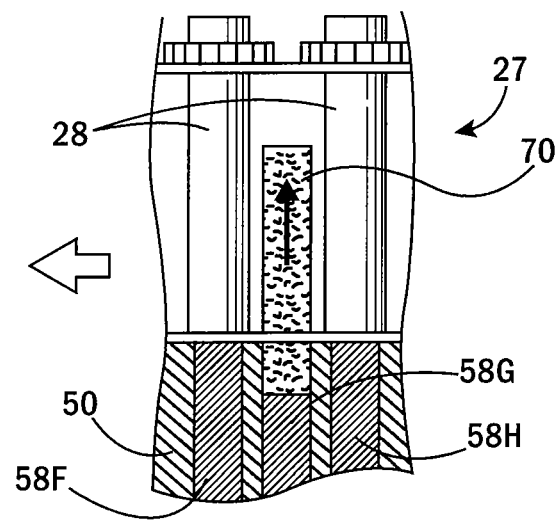
FIG. 7 is a fragmentary detail of FIG. 6 showing the ejection of the cheese in between the forming tubes while permitting filling of new bores in the shuttle block now aligned with the forming tubes.

Referring to FIG. 7, the inward motion of the ejection pusher 62 ejects the cheese 70 in the bores 56 of mold plugs 58*a*, 58*c*, 58*e*, and 58*g* backward toward the extruder. Then the cheese 70, as cut to length, may pass in between the forming tubes 28 of the assembly 27 through the cutouts 34 in the slide plate 32 shown in FIG. 1. Cheese sticks of precise length and volume may then drop downward, for example, into chilled brine or onto a carrier.

During this ejection process, the alternate bores, for example, associated with mold plugs 58*b*, 58*d*, 58*f*, and 58*h* may be simultaneously filled from forming tubes 28 providing a substantially continuous process. In this way back-and-forth motion of the shuttle block 50 and the motion of the ejection pusher 62 may provide for a steady stream of precisely formed cheese sticks.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. An apparatus for producing sections of extruded cheese comprising:
   a series of tubular sleeves of substantially constant cross-section having first ends adapted to receive cheese from an extruder;
   a series of pistons slidably fitting within corresponding tubular sleeves, the pistons having first ends contacting cheese filling the tubular sleeves from the extruder and second ends moving in a direction of extrusion as the tubular sleeves are filled with cheese;
   at least one blocking element stopping movement of the pistons when the tubular sleeves are filled with cheese to a predetermined volume; and
   an ejector operating upon a filling of the tubular sleeves to the predetermined volume to eject cheese from the tubular sleeves as molded cheese;
   further including set of forming tubes positioned between the extruder and the first ends of respective ones of the series of tubular sleeves, each forming tube having a cross-section substantially equal to the cross-section of a corresponding tubular sleeve, each forming tube positionable so that cheese passes through the forming tube from the extruder to be conducted to the corresponding tubular sleeve in filling the corresponding tubular sleeve and positionable so that cheese does not pass through the forming tube when cheese is ejected from the corresponding tubular sleeve by the ejector.

2. The apparatus of claim 1 wherein the ejector provides an actuator moving the second ends of the pistons counter to the direction of extrusion to eject cheese from the first ends of the tubular sleeves.

3. The apparatus of claim 2 further including a set of ports receiving cheese from the extruder and positioned between the extruder and the first ends of the series of tubular sleeves and wherein the tubular sleeves are mounted for reciprocation between a first and second position with respect to the ports in a direction substantially perpendicular to the direction of extrusion so that a first set of tubular sleeves may align with ports in the first position and a different, second set of tubular sleeves may align with the ports in the second position;
   wherein the ejector operates to move the second ends of the pistons of the first set of tubular sleeves against the direction of extrusion for the first set of tubular sleeves when the tubular sleeves are in the second position and to move the second ends of the pistons of the second set of tubular sleeves against the direction of extrusion when the tubular sleeves are in the first position.

4. The apparatus of claim 3 wherein an interface between the ports and the tubular sleeves provides a shearing of cheese extending between the ports and some tubular sleeves when the tubular sleeves move in the direction perpendicular to the direction of extrusion between the first and second positions.

5. The apparatus of claim 3 wherein the ports are spaced in a direction perpendicular to the direction of extrusion at twice a distance of spacing of the tubular sleeves perpendicular to the direction of extrusion and wherein the ejector provides an axially traveling ejector surface having spaced blocking elements contacting only every other piston.

6. The apparatus of claim 3 wherein the direction of extrusion is substantially horizontal and the ports are separated by a distance no less than a diameter of a tubular sleeve and provide downwardly opening channels therebetween allowing cheese ejected from the first ends of the tubular sleeves to drop downward therefrom.

7. The apparatus of claim 3 wherein the ports are second ends of forming tubes having first ends receiving cheese from the extruder and further including a mixer positioned between the extruder and the forming tubes providing first and second cheese input ports; and
   wherein the forming tubes are mounted for rotation about axes of the forming tubes to impart a spiral pattern to an interface between first and second cheese received from the first and second cheese input ports into the forming tubes.

8. The apparatus of claim 1 wherein the tubular sleeves are in adjacent parallel configuration and further including a sensor system detecting positions of the pistons indicating that multiple of the tubular sleeves are filled with cheese to the predetermined volumes to trigger the ejector.

9. The apparatus of claim 8 wherein the sensor system is an optical beam interrupted by movable elements moving out of occlusion with the optical beam by each piston when a corresponding tubular sleeve is filled with cheese to the predetermined volume.

10. The apparatus of claim 1 wherein the tubular sleeves are cylindrical tubes and the pistons are corresponding cylindrical rods.

11. The apparatus of claim 1 wherein the tubular sleeves are bores in a block of a fluorocarbon polymer.

12. The apparatus of claim 1 further including a mixer positioned between the extruder and the forming tubes providing first and second cheese input ports; and
   wherein the forming tubes are mounted for rotation about axes of the forming tubes to impart a spiral pattern to an interface between first and second cheese received from the first and second cheese input ports into the forming tubes.

13. A method for producing sections of extruded string cheese employing an apparatus having:
   a series of tubular sleeves of substantially constant cross-section having first ends adapted to receive cheese from an extruder;
   a series of pistons slidably fitting within corresponding tubular sleeves, the pistons having first ends contacting cheese filling the tubular sleeves from the extruder and second ends moving in a direction of extrusion as the tubular sleeves are filled with cheese;
   at least one blocking element stopping movement of the pistons when the tubular sleeves are filled with cheese to a predetermined volume; and
   an ejector operating upon a filling of the tubular sleeves to the predetermined volume to eject cheese from the tubular sleeves;
   further including set of forming tubes positioned between the extruder and the first ends of respective ones of the series of tubular sleeves, each forming tube having a cross-section substantially equal to the cross-section of a corresponding tubular sleeve, each forming tube positionable so that cheese passes through the forming tube from the extruder to be conducted to the corresponding tubular sleeve in filling the corresponding tubular sleeve and positionable so that cheese does not pass through the forming tube when cheese is ejected from the corresponding tubular sleeve by the ejector;

the method comprising the steps of:

(a) extruding cheese from an extruder into a series of tubular sleeves each holding pistons slidably fitting within corresponding tubular sleeves, the pistons having first ends contacting cheese filling the tubular sleeves from the extruder and second ends moving in a direction of extrusion as the tubular sleeves are filled with cheese;

(b) blocking movement of the pistons when the tubular sleeves are filled with cheese to a predetermined volume; and (c) ejecting cheese from the tubular sleeves upon a filling of the tubular sleeves to the predetermined volume.

14. The method of claim 13 wherein the ejecting moves the pistons counter to the direction of extrusion to eject cheese from the tubular sleeves.

15. The method of claim 14 further including the steps of:
extruding cheese through a set of ports into first ends of the series of tubular sleeves;
reciprocating the tubular sleeves between a first and second position with respect to the ports in a direction substantially perpendicular to the direction of extrusion so that a first set of tubular sleeves may align with ports in the first position and a different, second set of tubular sleeves may align with the ports in the second position;
wherein the step of ejecting operates to move the second ends of the pistons of the first set of tubular sleeves against the direction of extrusion for the first set of tubular sleeves when the tubular sleeves are in the second position and to move the second ends of the pistons of the second set of tubular sleeves against the direction of extrusion when the tubular sleeves are in the first position.

16. The method of claim 15 including the step of shearing of cheese extending between the ports and some tubular sleeves when the tubular sleeves move in the direction perpendicular to the direction of extrusion between the first and second positions.

17. The method of claim 15 wherein the ports are spaced in a direction perpendicular to the direction of extrusion at twice a distance of spacing of the tubular sleeves perpendicular to the direction of extrusion and wherein the step of ejecting moves at one time only every other piston.

18. The method of claim 15 wherein the direction of extrusion is substantially horizontal and the ports are separated by a distance no less than a diameter of a tubular sleeve and including the step of permitting cheese ejected from the tubular sleeves to drop downward between the ports.

19. The method of claim 15 wherein the ports are second ends of forming tubes having first ends receiving cheese from the extruder and further including a mixer positioned between the extruder and the forming tubes providing first and second cheese input ports; and further including the step of:
rotating the forming tubes about axes of the forming tubes to impart a spiral pattern to an interface between first and second cheese received from the first and second cheese input ports into the forming tubes.

20. The method of claim 13 wherein multiple of the tubular sleeves are filled with cheese to the predetermined volumes before ejection of cheese from the tubular sleeves.

* * * * *